March 19, 1935.    E. E. MORRISON    1,995,154
EDUCATIONAL DEVICE
Filed Aug. 11, 1933    2 Sheets-Sheet 1

INVENTOR.
Edith E. Morrison
BY John P. Chandler
her ATTORNEY.

March 19, 1935.  E. E. MORRISON  1,995,154
EDUCATIONAL DEVICE
Filed Aug. 11, 1933  2 Sheets-Sheet 2

INVENTOR.
Edith E. Morrison
BY
John P. Chandler
her ATTORNEY.

Patented Mar. 19, 1935

1,995,154

UNITED STATES PATENT OFFICE 1,995,154

EDUCATIONAL DEVICE

Edith E. Morrison, Great Neck, N. Y., assignor to J. Landowne Company, Inc., a corporation of New York Application August 11, 1933, Serial No. 684,613

9 Claims. (Cl. 35—2)

This invention relates to improvements in educational devices for children and relates more particularly to a device which will be highly amusing and interesting as well as instructional and educational.

It is a well known fact in the art of educating children that an apparatus which is in the nature of a puzzle, the solution of which offers the unexpected and the unknown provides far more interest for the child and develops his powers of concentration more rapidly than a device or toy with which the child is thoroughly familiar. An example of this is the well known jig-saw puzzle, which, however, has limited uses in the educational field since the final result is always a more or less conventional picture and the operation of putting it together is somewhat tiring.

One of the objects of the present invention is the provision of an instructive toy for children which will enable them to put together a plurality of different words, pictures, designs, color combinations, verses, stories partly in rhyme and partly in pictures, color combinations, as well as charts having mathematical calculations, geometrical representations and other instructive data, the device being so constructed that all of the parts thereof are integral with the container or box, in order that none of the parts will be lost.

To this end the invention contemplates the provision of a square or rectangular box having longitudinally grooved members secured to two opposite sides thereof. A plurality of dowels or shafts, each carrying a number of independently rotatable square blocks, are slidably supported at their end portions within the grooves or slots in the aforesaid members. The number of blocks on each shaft is such that their combined width is equal to the width of the box. Each block is provided on each of its four exposed faces with a portion or segment of a picture, design, verse or other pictorial illustration, and the adjacent blocks are provided with the adjacent portion of the picture. In this way four complete pictures, etc., may be placed on each group of blocks. The following means are provided to enable the various blocks in adjacent rows to be rotated independently of each other. The combined length of the various rows of blocks to be rotated is somewhat less than the inside length of the box in order that the rows may be separated sufficiently, by moving the shaft longitudinally of the slots, to allow the blocks on each shaft to be rotated without interfering with the blocks in the adjoining rows. When the blocks in the first row are rotated to their proper relative position in order to bring the picture segments of the row into registry, the entire row is moved transversely into place and the blocks in the second row are arranged in the same fashion.

In this manner an entire picture may be assembled and there is no space between the blocks as in some of the prior devices wherein octagonal blocks are mounted on fixed shafts. Another advantage of the invention is in the fact that the entire box is filled with the blocks except for the relatively small space which is provided in order to enable the blocks to revolve freely.

Still another object of the invention is the provision of an instructive toy for children which will constantly stimulate their interest by its variety of design and combination, and which will be relatively inexpensive to construct.

Other objects and advantages of the invention will be hereinafter specifically pointed out, or will become apparent, as the specification proceeds.

With the above indicated objects in view, the invention resides in certain novel constructions, combinations and arrangements of parts, clearly described in the following specification and fully illustrated in the accompanying drawings, which latter show an embodiment of the invention as at present preferred.

Figure 2:
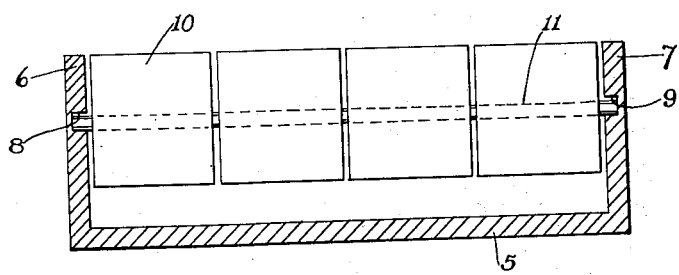
Fig. 2 is a vertical transverse section taken on line 2—2 of Fig. 1.
Figure 3:
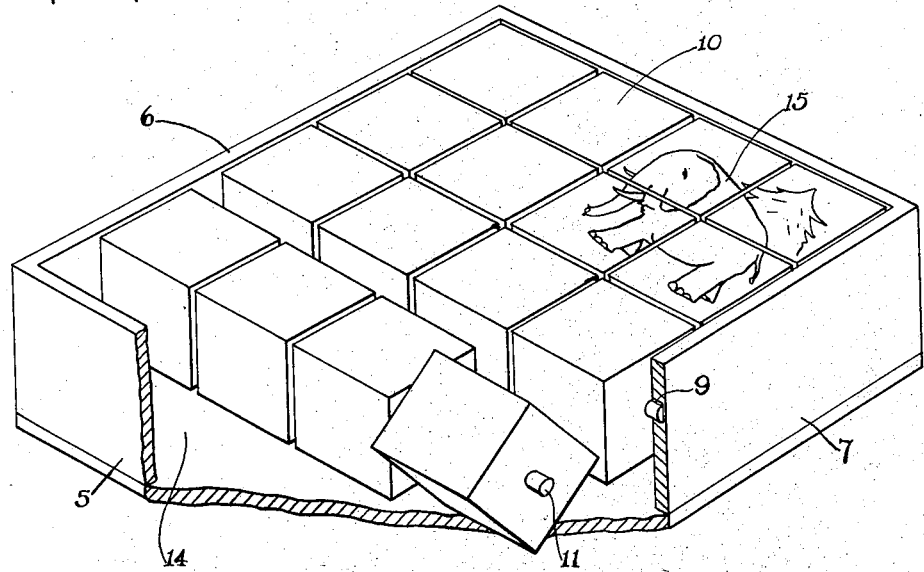
Fig. 3 is a broken perspective view of the device.
Figure 4:
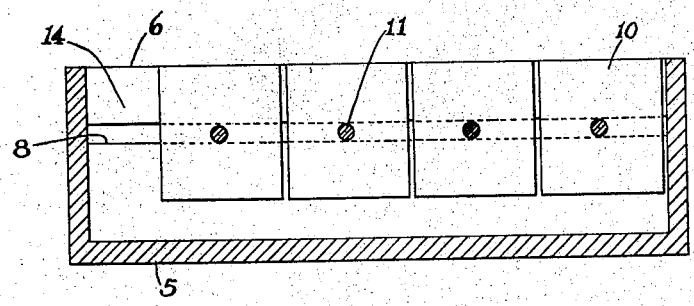
Fig. 4 is a transverse vertical section taken on line 4—4 of Fig. 1.

The embodiment of the invention which is illustrated in the drawings includes a rectangular box 5 having opposed side portions 6 and 7, said side portions having longitudinally grooved portions or slots 8 and 9 in their inner vertical faces. A plurality of blocks 10 are mounted on a dowel or shaft 11, the end portions of the shaft being supported in their slots and are adapted for easy longitudinal movement therein as well as for rotative movement. The blocks are square and are preferably made from cardboard and are hollow. The side portions of the box are somewhat higher than the width of the blocks so that when the upper surfaces of the latter are flush with the upper edges of the box, as shown in Figs. 2 and 4, the lower surfaces of the blocks will be sufficiently raised above the base portion of the box to permit free rotation. It will also be apparent from a consideration of Fig. 2 that the upper surface of the blocks are on the same plane as the upper edge of the container. Each of the four exposed faces of each block is provided with a suitable figure, as for example, the letters of the alphabet as designated at 12. Another group of the blocks may have mathematical calculations thereon as indicated at 13, the problem being on one block and the answer or result being on the adjoining block. In Fig. 3 I have illustrated an elephant as shown at 15, on four adjoining blocks.

The embodiment of the invention illustrated in the drawings shows four rows of four blocks each. In practice, however, a larger embodiment may be constructed in order to provide a number of complete pictures or the like on each group of blocks. For instance, the upper left hand group of blocks may contain, on its four sides, respectively, a picture puzzle, the alphabet, a nursery rhyme in verse and picture and some mathematical calculations. The upper right hand group may contain a second picture puzzle, a chart of color combinations, a song and some geometrical representations. The lower left hand corner may contain a novel design, some children's verses, etc.

Figure 1:
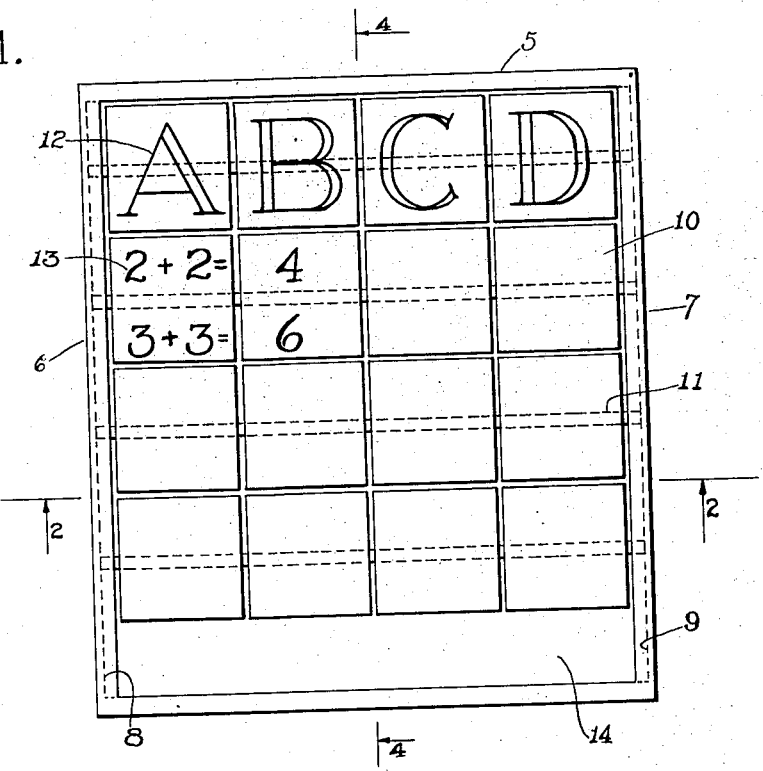
Fig. 1 is a top plan view of the embodiment of the invention in its preferred form.

As shown in Figs. 1 and 3, the total length of the box is somewhat in excess of the combined length of the various rows of blocks, thereby leaving a space indicated at 14 to provide means for revolving the individual blocks in the adjacent rows.

The hereinbefore described construction admits of considerable modification without departing from the invention; therefore, it is the wish not to be limited to the precise arrangements shown and described, which are, as aforesaid, by way of illustration merely. In other words the scope of protection contemplated is to be taken solely from the appended claims, interpreted as broadly as is consistent with the prior art.

What I claim is:

1. In an educational device, a plurality of rows of blocks, a shaft passing through each row of blocks, means for supporting each shaft at its ends, said shafts being movable longitudinally in said means to permit independent rotation of the individual blocks, a portion of a picture or the like on the face of the blocks and an adjoining portion of the picture on the adjacent blocks whereby a completed picture may be made by rotating the blocks so that their proper faces are exposed.

2. In an educational device, a plurality of rows of blocks, a shaft passing through the blocks in each row, means for slidably supporting the shafts at the end thereof to enable each row to be moved relative to the adjacent row to permit independent rotation of the blocks, a portion of a picture or the like secured to the exposed faces of the blocks and an adjacent portion of the picture secured to an adjoining block.

3. In an educational device for children, a box, a plurality of shafts extending over the width of the box and slidably supported at their ends in opposed side portions thereof, a plurality of blocks rotatably carried on each of said shafts, the combined length of the rows of blocks being less than the length of the box to permit the rows to be moved longitudinally in order to enable the blocks to be rotated, each of said blocks having, in each of its exposed faces, a portion of a picture or the like, each adjacent block having the adjacent portion of the picture so that when the blocks are revolved to expose their proper faces a completed picture will be visible.

4. In an educational device for children, the combination of a box having inwardly facing grooves extending longitudinally along two opposed side portions, a plurality of shafts slidably and rotatably supported at their ends within said grooves, a plurality of square blocks carried on each of said shafts, the combined width of the blocks being equal to the width of the box, the combined length of the rows of blocks being less than the length of the box to enable the row of the blocks to be moved longitudinally of the grooves to permit the individual blocks to be rotated, each of said blocks having, in each of its exposed faces, a portion of a picture or the like, each adjacent block having the adjacent portion of the picture so that when the blocks are revolved to expose their proper faces a completed picture will be visible.

5. In an educational device for children, the combination of a box having inwardly facing grooves extending longitudinally along two opposed side portions, a plurality of shafts extending over the width of the box and slidably supported at their ends within said grooves, a plurality of square blocks carried on each of said shafts, the combined length of the rows of blocks being less than the length of the box to permit the rows of blocks to be moved longitudinally of the grooves to enable the individual blocks to be fully rotated, a portion of a picture or the like being secured to each of the exposed faces of each block, each adjacent block having the adjacent portion of the picture so that when the blocks are revolved to expose their proper faces a completed picture will be visible.

6. In a device of the class described, the combination of a box having inwardly facing grooves extending longitudinally along two opposed side portions, a plurality of shafts slidably and rotatably supported at their ends within said grooves, a plurality of square blocks carried on each of said shafts, the combined width of the blocks being equal to the width of the box, the combined length of the rows of blocks being less than the length of the box, whereby the box will have a space to allow for free rotation of the blocks, each of said blocks having, in each of its exposed faces, a portion of a picture or the like, each adjacent block having the adjacent portion of the picture so that when the blocks are revolved to expose their proper faces a completed picture will be visible.

7. In an educational device for children, the combination of a plurality of rows of blocks, a shaft passing through each row of blocks, said blocks being adapted to rotate on said shafts, end supports for the shafts having longitudinal grooves therein to permit longitudinal movement of the ends of the shafts within said grooves, a portion of a picture or the like affixed to each exposed face of the blocks and the adjacent portion of the picture affixed to the adjacent blocks.

8. In a picture puzzle and the like a plurality of rows of independently rotatable blocks having segments of pictorial representations on their several exposed faces, shafts passing through each row of blocks, supporting means for the ends of the shafts, the terminals of said shafts being longitudinally moveable in said supporting means to permit rotation of the individual blocks.

9. In a picture puzzle, the combination of a plurality of rows of blocks, a shaft passing through the blocks in the several rows, means for slidably supporting the shafts at the terminals thereof to enable each row to be moved relative to the adjacent row to permit independent rotation of the individual blocks, the exposed faces of the blocks being provided with pictorial matter or other indicia which may be variably aligned or appropriately related.

EDITH E. MORRISON.